Patented Aug. 29, 1944

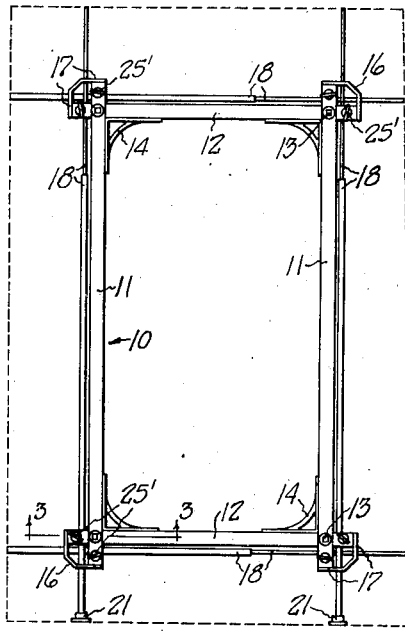
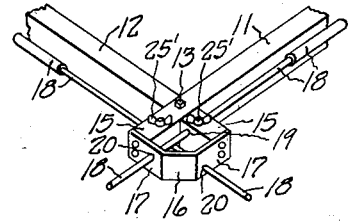
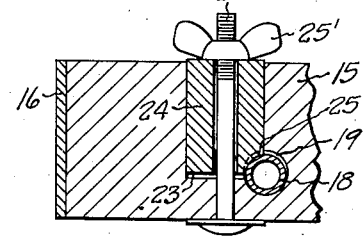
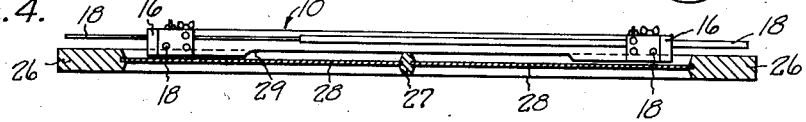
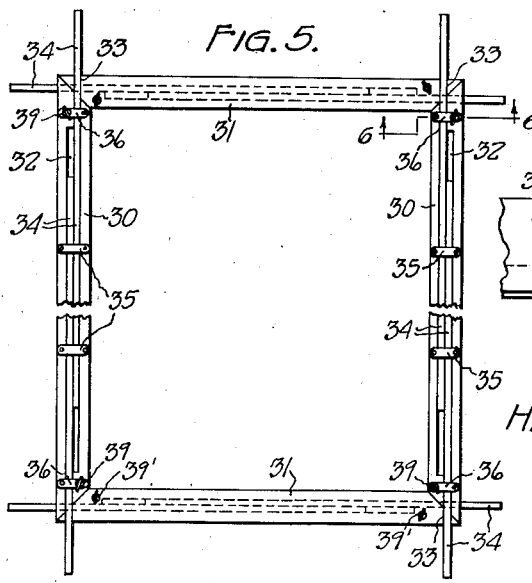
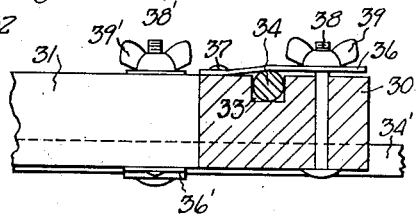
HARLEY H. FIRESTONE.
INVENTOR.

2,356,923

UNITED STATES PATENT OFFICE 2,356,923

MEASURING DEVICE

Harley H. Firestone, South Bend, Ind.

Application December 13, 1943, Serial No. 514,093

12 Claims. (Cl. 33—194)

This invention relates to improvements in measuring devices. More particularly, the invention relates to a device for quickly and accurately measuring an opening into which a closure is to be fitted.

One use of the device is for measuring the openings of a building, such as door and window openings, in which doors, storm doors, screen doors, storm sash and window screens are to be fitted. Door frames and window frames of buildings, and particularly frame buildings, are frequently out of true. This may result from any one of a large number of causes, such as poor construction, age, settling of foundations and the like, and is encountered in a high percentage of houses. Consequently, it is not possible to fit a door or window by simple measurement of the height and width thereof, except on an unsatisfactory time-consuming "cut and try" basis. Various devices have been conceived in attempts to provide dependable means for measuring an opening to permit quick and accurate fitting of a closure for the opening. To the best of my knowledge these devices have proven unsatisfactory for different reasons which have prevented their commercial acceptance and use.

It is the primary object of my invention to provide a device of this character which is accurate, strong, light in weight, easy to adjust, inexpensive, and capable of adjustment to measure a wide range of sizes of openings.

A further object is to provide a device of this character having a rigid rectangular frame, a plurality of elongated members slidably carried by said frame, and means for locking said members in selected adjusted position projecting from said frame.

A further object is to provide a device of this character having a rigid rectangular frame formed from elongated members whose end portions intersect, and telescoping tubes slidably supported by the terminal portions of opposed frame members.

A further object is to provide a device of this character having a rigid frame formed from elongated members whose end portions intersect and are interconnected by rigid corner pieces, said end portions and corner pieces having aligned openings adapted to slidably support elongated measuring members.

Other objects will be apparent from the description and appended claims.

In the drawing:

Fig. 1 is a view of the device in side elevation.

Fig. 2 is a fragmentary perspective view of the device illustrating the corner construction thereof.

Fig. 3 is an enlarged detail sectional view taken on line 3—3 of Fig. 1.

Fig. 4 is an edge view of the device applied to a storm sash.

Fig. 5 is a side view of a modified embodiment of the invention.

Fig. 6 is an enlarged detail sectional view taken on line 6—6 of Fig. 5, with some parts shown in elevation.

Referring to the drawing, and particularly to Figs. 1 to 4, which illustrate one embodiment of the invention, the numeral 10 designates a rectangular frame formed from side members 11 and end members 12 which intersect in spaced relation to their ends. Members 11 and 12 are joined to lie in a common plane and are interconnected by bolts 13 or like securing means. Brackets 14 reinforce the frame at the corners thereof. The end portions 15 of the frame members project outwardly in perpendicular relation at each corner of the frame. A rigid corner piece 16, preferably formed of a rigid elongated plate bent into substantially L-shape, is secured at its ends to the end edges of frame end portions 15 at each corner of the frame whereby each leg 17 of said corner piece is positioned in outwardly spaced parallel relation to one of said end portions 15.

A pair of telescoping elongated tubes 18 fitting snugly and slidably one within the other is positioned in outwardly spaced parallel relation to each of the frame members 11 and 12. Each tube fits slidably in a transverse passage 19 in the end portion 15 of a frame member perpendicular thereto and through a hole 20 in the leg portion 17 of the adjacent corner piece 16. Thus the end portion of each tube of each interfitting pair of tubes is provided with a pair of spaced aligned supports. The inner ends of the tubes normally support and guide each other. For this purpose, the constituent tubes forming each interfitting pair are of lengths only slightly shorter than the length of the frame member adjacent and parallel thereto. However, where large openings are being measured, which require separation of the normally interfitting tubes, each constituent tube still has an effective two point support provided by the passage 19 and the opening 20 in the corner piece, respectively. Tubes 18 are arranged at different levels, i. e. the tubes extending along the sides of the frame being positioned adjacent one face of the frame and the tubes extending along the ends of the frame being positioned adjacent the other face of the frame, whereby the tube portions cross each other in spaced relation between the frame and the corner piece, as illustrated in Fig. 3. One tube of each longitudinal tube pair may mount a head or fitting 21 upon which the device may rest during measurement, as illustrated in Fig. 1.

Means are provided for releasably locking each tube against longitudinal sliding, as shown in Fig. 3. A passage is formed through end portion 15 of each frame member perpendicular to passage 19, said passage being of small diameter at one end to receive the shank of a bolt 22, the remaining portion 23 thereof being of larger diameter and communicating with passage 19 at its inner end. A locking member 24 fits snugly within passage 23 and has a portion of its inner end cut away at 25, preferably arcuately, to fit solidly against tube 18. A thumb nut 25' is threaded on bolt 22 and bears upon locking member 24 to press the same into firm frictional engagement with tube 18 within passage 19. The clamping action thus obtained is solid enough to effectively position the tube, in cooperation with the opening 20 in the corner piece, even when the tubes are extended outwardly to positions where their inner ends are spaced or separated.

In the use of the device, the longitudinal tubes at one end of the frame, and possibly the lower tube at one side of the frame, will be adjusted to approximately correct position before the device is inserted in the opening to be measured. The device is then inserted in the door or window opening illustrated by dotted lines in Fig. 1, at the position which the closure member to be fitted is to assume, and rests upon the preadjusted lower tubes, as upon the tube fittings 21. The remaining tubes will then be adjusted in position engaging the edge of the building opening and locked in adjusted position. Upon removal of the device from the building opening it is laid upon the storm sash or other member to be fitted, as shown in Fig. 4. The shape and size of the opening in which the sash is to fit can be marked upon the sash by holding a straight edge member against the ends of the projecting tubes and marking the sash frame, guided by said straight edge. The marking serves as a guide for sawing the sash frame. The sash is now of proper shape, but is slightly oversize and rough. Planing to smooth the sash edge reduces the size to substantially fit the opening. The sash can then be inserted in the opening to test its fit, and usually only a small amount of finishing is required, at points observed in the test fitting, to obtain the accurate fit desired.

Inasmuch as most storm windows are of the construction illustrated in Fig. 4, comprising frame 26, one or more dividing bars 27 and multiple glass panes 28, it is desirable that the central portions of the frame members 11 and 12 be cut away at 29 at one side or face thereof, or otherwise formed to provide a central reduced thickness portion. This permits the device to fit partially within the sash frame, whereby two opposed sets of tubes may engage the faces of the sash frame at their projecting ends, and thus provide a solid mounting of the device on the storm sash to facilitate the marking operation. When use of the device is completed, all tubes may be slid to and locked in retracted position, so that the size of the device, for storage purposes, may be considered to be the over-all size of the frame thereof. While the frame has been illustrated as formed from wood, other material may be used in place thereof. Likewise, different types of clamping means than those illustrated may be employed, and many other structural details and characteristics may be altered from those shown and described above.

An alternative construction of the device is illustrated in Figs. 5 and 6. A rigid rectangular frame is formed from side members 30 and end members 31. Each of the frame members has a longitudinal groove 32 formed in one face thereof, the end portions 33 of which are preferably of approximately one-half the width of the major portion thereof and are disaligned. The grooves in the side members 30 are formed in the faces thereof at one side of the frame, and those in the end members 31 are formed in the faces thereof at the opposite side of the frame. Elongated measuring members 34, which may be rods, dowels or tubes, fit side by side in pairs within each of the grooves 32, each extending through one of the reduced end portions 33 of the grooves. Members 34 have a snug sliding fit within said grooves, and the grooves are preferably of a depth whereby a portion of said members projects beyond the face of the frame member, as shown in Fig. 6.

A plurality of spaced straps or plates 35 extend transversely of the grooved face of each frame member to confine members 34 in the grooves without interfering with free sliding thereof in said grooves. At each end of each frame member suitable means are provided for releasably clamping one of the members 34 against sliding. As here illustrated this means may comprise a plate 36 anchored at 37 to the frame member at one side of groove portion 33. Plate 36 extends transversely of the frame member and has a hole in its opposite end fitting loosely around the shank of a bolt 38 extending through the frame member. A thumb screw 39 threaded on the bolt may depress the free end of plate 36 to clamp the rod firmly in its groove. Inasmuch as the grooves are formed in both faces of the frame, the arrangement of locking means illustrated at the left in Fig. 6 is desirable with respect to the means for locking the members 34' mounted in the grooves at the side or face of the frame which is to be positioned inwardly when measuring an opening. This arrangement merely entails positioning of the bolt 38' so that its head bears against plate 36' and its thumb screw 39' is positioned adjacent and at the same face as in the arrangement previously described.

This construction possesses substantially the same advantages as the preferred embodiment, and is used in the same way.

I claim:

1. In a measuring device, a rigid rectangular frame having side and end members, a plurality of elongated members carried by said frame and arranged in pairs along each frame member for guided endwise sliding movement, and releasable means carried by said frame members at opposite ends thereof and each locking one of said elongated members against sliding.

2. In a measuring device, a flat rigid frame having a plurality of angularly extending marginal frame members, a plurality of elongated members carried by said frame for guided endwise sliding movement and arranged in pairs along each frame member, and means carried by said frame members for releasably clamping said elongated members in selected position.

3. In a measuring device, a flat rigid frame, a plurality of elongated measuring members carried by said frame for guided endwise sliding movement and arranged in pairs, the measuring members of each pair normally having sliding guiding engagement at their inner ends, and means carried by said frame for releasably locking said measuring members in selected position.

4. In a measuring device, a flat rigid frame, a plurality of angularly disposed pairs of elongated measuring members carried by said frame, the measuring members of each pair having relatively slidable mutually guiding engagement at their inner ends, guide means on said frame slidably engaged by the outer ends of said measuring members, and clamping means carried by said frame and releasably engaging said measuring members.

5. In a measuring device, a rigid rectangular frame having side and end members intersecting in inwardly spaced relation to their ends, opposite projecting end portions of said frame members having axially aligned transverse openings therethrough, a plurality of pairs of elongated telescoping members each slidable in a pair of said aligned openings and normally spanning opposed frame members, and releasable means for locking said elongated members in selected positions.

6. In a measuring device, a rigid rectangular frame, a plurality of pairs of telescoping members spanning said frame, said frame having aligned passages at opposite sides thereof to slidably receive the opposite ends of a pair of telescoping members, and means carried by said frame for releasably locking each of said telescoping members in selected position.

7. In a measuring device, a rigid rectangular frame having marginal frame members arranged in intersecting relation, the terminal projecting portions of each frame member having a passage therethrough parallel to an adjacent frame member, a plurality of pairs of elongated members fitting one within the other with their outer ends fitting slidably in said passages, and clamping members carried by each terminal portion for releasably clamping an elongated member in selected position.

8. In a measuring device, a rigid rectangular frame, a plurality of pairs of relatively slidable interfitting elongated members spanning said frame, said frame having passages at opposite marginal portions thereof for slidably supporting the ends of each of said pairs of elongated members and having openings therein extending in angular relation to and communicating with said passages, clamp members fitting in said openings and engageable with the portions of said elongated members in said passages, and means pressing said clamp members into firm frictional engagement with said elongated members.

9. In a measuring device, a rigid rectangular frame having marginal frame members arranged in intersecting relation to provide projecting terminal portions each having a transverse passage therethrough, rigid corner pieces spanning the ends of adjacent terminal portions and having guide openings axially aligned with said passages, and a plurality of elongated members extending through said aligned passages and guide openings.

10. In a measuring device, a rigid rectangular frame having marginal frame members arranged in intersecting relation to provide projecting terminal portions each having a transverse passage therethrough, rigid corner pieces spanning the ends of adjacent terminal portions and having guide openings axially aligned with said passages, and a plurality of elongated members extending through said aligned passages and guide openings, and releasable means for clamping said elongated members in fixed relation to said frame.

11. In a measuring device, a flat rigid frame having side members and end members, said side members having longitudinal grooves in one face thereof and said end members having longitudinal grooves in the opposite face thereof, each frame member carrying a pair of elongated members slidable lengthwise in said grooves, retainer members spanning said grooves to confine said elongated members in said grooves, and means for clamping said elongated members in selected position in said grooves.

12. In a measuring device, a flat rigid frame having longitudinally grooved side and end members, the grooves of said side members being formed in one face of said frame and the grooves of said end members being formed in the opposite face of said frame, a pair of elongated members slidable in each groove, and means for retaining said elongated members in said grooves, some of said retaining means being adjustable to clamp said elongated members in selected position.

HARLEY H. FIRESTONE.